United States Patent Office 2,908,697
Patented Oct. 13, 1959

2,908,697
PROCESS OF PREPARING SOAPS OF WAX ACIDS OF HIGH MOLECULAR WEIGHT FROM NITRATED HYDROCARBONS

Josef Kaupp and Friedrich Zimmert, Gersthofen, near Augsburg, Germany, assignors to Farbwerke Hoechst Aktiengesellschaft vormals Meister Lucius & Bruning, Frankfurt am Main, Germany, a corporation of Germany No Drawing. Application April 3, 1956
Serial No. 575,706

Claims priority, application Germany April 9, 1955

11 Claims. (Cl. 260—413)

The present invention relates to a process of preparing soaps of wax acids of high molecular weight from nitrated hydrocarbons from which soaps, the wax acids may be obtained through suitable acidification.

It is known that primary aliphatic nitro compounds react with aqueous mineral acids in the following manner:

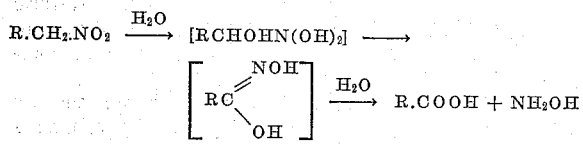

(C. D. Nenitzescu, D. A. Isacescu, Bull. Soc. chim. Romania 14, 53 (1932)). When using sulfuric acid of 85 percent strength, hydroxyl ammonium sulfate can be isolated in a very good yield. Secondary and tertiary nitro compounds react likewise with mineral acids while being at least partly denitrated although the reaction does not follow a definite course. Rather, undefined resinification products are obtained.

According to the process of the invention we now propose to subject to the process of cracking with mineral acids the nitro compounds obtained when nitrating aliphatic hydrocarbons of a molecular weight of about 500 to 4000, for example, solid Fischer-Tropsch paraffins. Depending on the concentration of the acid employed, products are obtained which contain greater or smaller portions of resinification products and are of a lighter or darker color and are practically free from nitrogen. These products are then freed from adhering resinification products in a solution of strong sulfuric acid with 10 to 50 percent of chromic acid $CrO_3$, calculated on the quantity of the nitration product used; the product obtained is treated with an excess of alkali-metal hydroxides or alkaline earth metal hydroxides or alkali-metal carbonates or alkaline earth metal carbonates, and the substances still contained in the starting product, which cannot be saponified, are extracted with a suitable solvent. If necessary, the free acids can be obtained from the alkali-metal salts formed by adding mineral acids.

The process of the invention is carried out in such a manner that the nitrated hydrocarbons are brought into close contact with the sulfuric, phosphoric or hydrochloric acid, for example by stirring or by means of an emulsifier. It has proved advantageous to work at temperatures at which the nitration products are available in a fused form. Particularly favorable results are obtained when the treatment with said acids is carried out at temperatures ranging from 100° C. to 140° C., preferably at 105° C. to 125° C. However, the present reaction may also be effected with application of pressure so that the operation may be carried out at still higher temperatures. The content in greasy dark substances which effect the coloration in the product obtained after the treatment with said acids is due to the content of the starting product in secondary and tertiary nitro groups. The formation of resinification products increases as well as the speed of the hydrolysis with the concentration of the acid employed. When using, for example, a sulfuric acid of 20 percent by volume, almost no resinification occurs; the reaction, however, occurs rather slowly; when using a sulfuric acid of 70 percent by volume, the hydrolysis follows a very rapid course, but with strong resinification. In general, therefore, the operation is carried out with sulfuric acid of about 20 to 60 percent by volume. The most favorable results are obtained when carrying through the hydrolysis with sulfuric acid of 35 to 45 percent by volume. Instead of sulfuric acid, hydrochloric acid of 20 to 38 percent by weight or phosphoric acid of 20 to 60 percent strength may be used, although in general no additional advantages are obtained thereby.

The products containing wax acids, which are prepared in the aforementioned manner can be freed from the adhering resinification products by treating them with sulfuric acid containing chromic acid at temperatures from 100° C. to 140° C., preferably at 105° C. to 125° C. It was found that if the nitration products had a nitrogen-content of 1 to 3 percent by weight, the best products are obtained when using $CrO_3$ in an amount of 10 to 50 percent by weight, advantageously 30 to 50 percent by weight, calculated on the quantity of the employed nitration product. Those skilled in the art can easily find out which sulfuric acid concentrations and which chromic acid concentrations may best be used in the sulfuric acid of this degree. The general conditions correspond to the customary bleaching with chromo-sulfuric acid. However, owing to the proportions of solubility of the chromic acid in the sulfuric acid, advantageously sulfuric acid of a concentration of 20 to 40 percent by volume is used since still sufficient quantities of chromic acid dissolve in this acid.

When employing sulfuric acid, the hydrolysis of nitro compounds of high molecular weight and subsequent oxidation with chromic acid may also be carried out in one step by causing the nitration product to react at once with sulfuric acid containing chromic acid at 100° C. to 140° C., preferably at 105° C. to 125° C., for a sufficiently long period, for example 2 to 8 hours. The undesirable cleavage products of secondary nitro compounds are thus at once decomposed by oxidation at the moment when they have originated and finally likewise transformed into carboxyl acids. If the treatment with acid and the oxidation are carried out in two steps, in general smaller quantities of chromic acid will suffice than when carrying through the reaction in one step. However, also in this case, the quantity of the chromic acid employed should suitably be within the range as indicated above. Portions of unreacted hydrocarbons which may be contained in crude starting products can be separated by removing the wax acids from the product which is obtained after the oxidation with chromic acid, with alkaline earth metal hydroxides or carbonates or rather alkali metal hydroxides or carbonates under the generally known conditions and extracting the substances which cannot by hydrolyzed with a suitable solvent—advantageously paraffin hydrocarbons having a boiling point of about 100° C., such as heptane or a benzine fraction rich in heptane. The substances which cannot be hydrolyzed may, if desired, be again subjected to a nitration and treated according to the process of this invention either alone or after having been mixed with additional hydrocarbons.

The fatty or wax acids obtained by treatment with mineral acid from the alkali metal salts which have been obtained in the manner described afore, are partly of a light yellow color, partly colored somewhat darker. They can be esterified readily and serve as base products for hard waxes. For the reaction proposed according to the process of the invention, not only nitrated hard paraffins, but also nitrated polyethylenes and nitrated telomerisates of ethylene with paraffins may be used as base products which are liquid under the reaction conditions and whose basic hydrocarbons have a molecular weight of about 500 to 3,000–4,000. When carrying out the present reaction it is expedient to use such products as base material as are straight-chained or branched only slightly so that they may contain at least about 20 carbon atoms in a straight chain. Furthermore, it is not necessary to start from purified nitro-hydrocarbons, and the products containing as yet unchanged hydrocarbons, which have been obtained during the nitration, may be employed.

The following examples serve to illustrate the invention; but they are not intended to limit it thereto:

Example 1

200 grams of a nitrated hard paraffin (N:1.4 percent; acid number 13, hydrolysis number 27) were vigorously stirred for 6 hours with sulfuric acid of 40 percent by volume at a temperature of 110° C. to 115° C. After this period, nitrogen could no longer be traced. The grey-yellow product, which was separated from the acid, was stirred at 120° C. for another 6 hours with 200 cc. of sulfuric acid of about 50 percent strength, containing 22 grams of $CrO_3$. After hydrolysis with potassium hydroxide and removal of the substances which could not be hydrolyzed, a hard, yellow wax was isolated from the oxidation product thus obtained with a yield of 35 percent, an acid number of 159 and a hydrolysis number 159, which melted at 101° C.

Example 2

50 grams of a crude nitrated hard paraffin (N:1.4 percent; acid number 13; hydrolysis number 27) were emulsified in an aqueous solution and then vigorously stirred with 200 cc. of sulfuric acid of about 50 percent strength containing 22 grams of $CrO_3$ for 180 minutes at an oil-bath temperature of 120° C. After removal of the chromium salts, the emulsion was hydrolyzed with potassium hydroxide in the usual manner and the alkali salts freed by extraction with a heptane fraction from unchanged paraffin and other constituents which cannot be hydrolyzed. A light-yellow, very hard wax was obtained from the alkali soaps with a yield of 35 percent (calculated on the base material) and the following characteristic numbers:

Acid number _____ 81
Hydrolysis number _____ 99
Molecular weight (calculated 684) _____ 700
Melting point _____° C__ 107

Example 3

3.3 kilos of a nitrated hard paraffin (N:1.4 percent; acid number 14; hydrolysis number 28) were reacted in the above described manner for 6 hours at a bath temperature of 120° C. with 3.5 liters of sulfuric acid of about 50 percent strength containing 385 grams of $CrO_3$. After the usual working up, 1.2 kilos of a light brown wax were obtained with the following characteristic numbers:

Acid number _____ 61
Hydrolysis number _____ 71
Melting point _____° C__ 107

By esterification of the wax acid so obtained with octadecylalcohol, a hard ester wax was obtained of the acid number 3.2; the hydrolysis number 53.6; and the melting point 103° C.

Example 4

A wax acid with the acid number 120 and a melting point of 100° C. was obtained from 200 grams of a nitrated hard paraffin (N:2.8 percent; acid number 44) which had been treated according to the process of the invention with 430 cc. of a sulfuric acid solution containing 47 grams of $CrO_3$ according to Example 2.

We claim:

1. A process of preparing soaps of wax acids which comprises hydrolyzing crude molten nitration products of aliphatic hydrocarbons, which aliphatic hydrocarbons have a molecular weight of about 500 to about 4000, by treatment with a compound selected from the group consisting of sulfuric acid of 20 to 60 percent by volume, phosphoric acid of 20 to 60 percent by volume and hydrochloric acid of 20 to 38 percent by weight at about 100° C. to about 140° C., removing adhering resinification products by treatment with about 10 to about 50 percent chromic acid, $CrO_3$, calculated on the quantity of the nitration product used, in a sulfuric acid solution, treating the product obtained with a compound selected from the group consisting of alkali metal hydroxides, alkali metal carbonates, alkaline earth metal hydroxides and alkaline earth metal carbonates and solvent extracting the substances which cannot be hydrolyzed.

2. A process as claimed in claim 1 wherein sulfuric acid of a concentration of about 20 to about 60 percent by volume is used in order to transform the nitro compounds into carboxylic acids.

3. A process as claimed in claim 2 wherein sulfuric acid of a concentration of 35 to 45 percent by volume is used.

4. A process of preparing soaps of wax acids which comprises hydrolyzing molten nitration products of aliphatic hydrocarbons, which aliphatic hydrocarbons have a molecular weight of about 500 to about 4000, by treatment with a solution of 10 to 50 percent chromic acid, $CrO_3$, calculated on the quantity of the nitration product used in sulfuric acid of 20 to 40 percent by volume at a temperature of about 100° C. to about 140° C., treating the product obtained with a compound selected from the group consisting of alkali metal hydroxides, alkaline earth metal hydroxides, alkali metal carbonates, and alkaline earth metal carbonates and solvent extracting the substances which cannot be hydrolyzed.

5. A process as claimed in claim 1 wherein the cleavage of the nitro compounds is carried out at about 105° C. to about 125° C.

6. A process as claimed in claim 1 wherein 30 to 50 percent of chromic acid, $CrO_3$, calculated on the quantity of the nitration product used is employed.

7. A process as claimed in claim 1 wherein the operation is carried out under atmospheric pressure.

8. A process as claimed in claim 1 wherein the first stage of the reaction is carried out in the presence of an emulsifier.

9. A process of preparing soaps of wax acids which comprises hydrolyzing crude molten nitration products of aliphatic hydrocarbons, which aliphatic hydrocarbons have a molecular weight of about 500 to about 4000, by treatment with a compound selected from the group consisting of sulfuric acid of 20 to 60 percent by volume, phosphoric acid of 20 to 60 percent by volume and hydrochloric acid of 20 to 38 percent by weight at about 100° C. to about 140° C., removing adhering resinification products by treatment with about 10 to about 50 percent chromic acid, $CrO_3$, calculated on the quantity of the nitration product used, in a sulfuric acid solution, treating the product obtained with a compound selected from the group consisting of alkali metal hydroxides, alkali metal carbonates, alkaline earth metal hydroxides and alkaline earth metal carbonates and extracting the substances which cannot be hydrolyzed with a solvent selected from the group consisting of heptane, and a benzine fraction rich in heptane.

10. A process of preparing soaps of wax acids which comprises hydrolyzing crude molten nitration products of aliphatic hydrocarbons, said aliphatic hydrocarbons contain at least about 20 carbon atoms in a straight chain and have a molecular weight of about 500 to about 4000, by treatment with sulfuric acid of 35 to 45 percent by volume at a temperature in the range from 105° C. to 125° C., removing adhering resinification products by treatment with 30 to 50 percent chromic acid, $CrO_3$, calculated on the quantity of the nitration product used, in sulfuric acid of 20 to 40 percent by volume, treating the product obtained with a compound selected from the group consisting of alkali metal hydroxides, alkaline earth metal hydroxides, alkali metal carbonates, and alkaline earth metal carbonates and solvent extracting the substances which cannot be hydrolyzed.

11. A process of preparing soaps of wax acids which comprises hydrolyzing nitration products of hard paraffin, which hard paraffin has a molecular weight of about 500 to about 4000, by treating with sulfuric acid of 20 to 60 percent at about 100° C. to about 140° C., removing the adhering resinification products by treatment with 10 to 50 percent of chromic acid $CrO_3$, calculated on the quantity of the nitration product used, in a sulfuric acid solution at a temperature in the range from 100 to 140° C., treating the product obtained with a compound selected from the group consisting of alkali metal hydroxides, alkali metal carbonates, alkaline earth metal hydroxides and alkaline earth metal carbonates and extracting the substances which cannot be hydrolyzed with a solvent selected from the group consisting of heptane, and a benzine fraction rich in heptane.

References Cited in the file of this patent

UNITED STATES PATENTS

| | | |
|---|---|---|
| 1,912,123 | Beck et al. | May 30, 1933 |
| 2,771,482 | Brown et al. | Nov. 20, 1956 |